May 6, 1930.  G. N. VIVENOY  1,757,029
COMBINATION TOOL
Filed Feb. 10, 1928     2 Sheets-Sheet 1
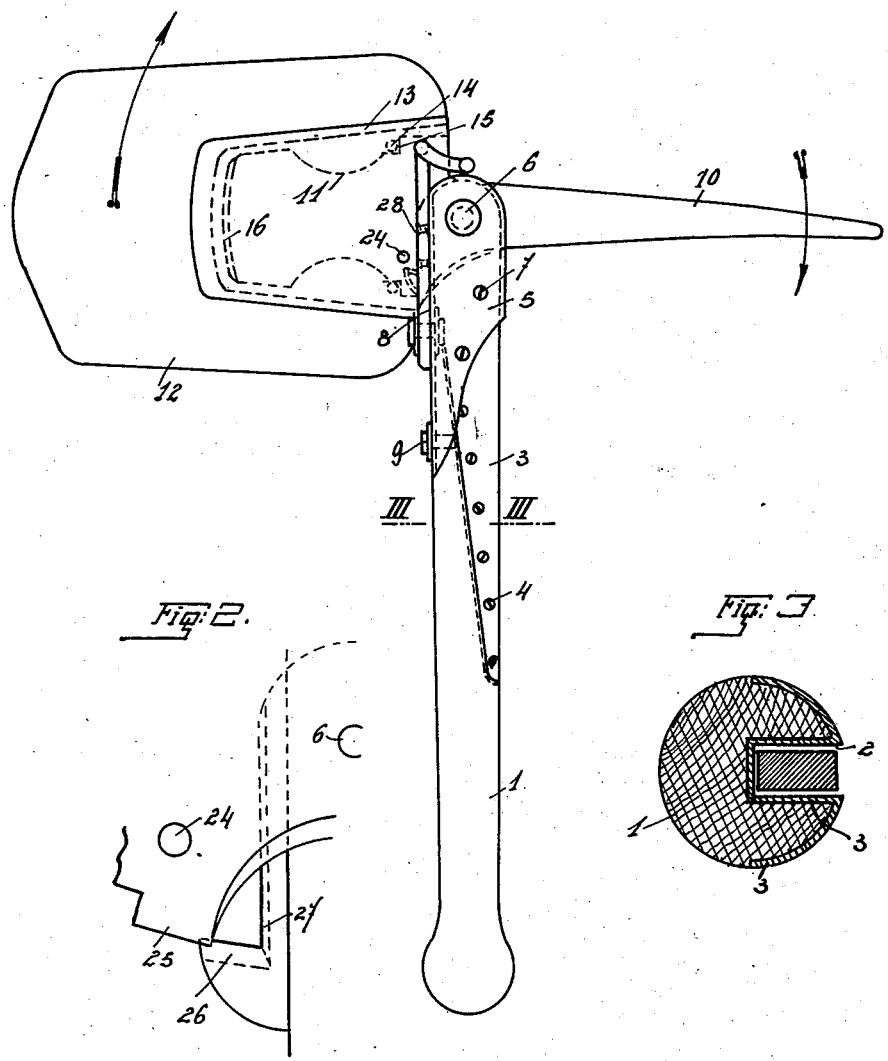
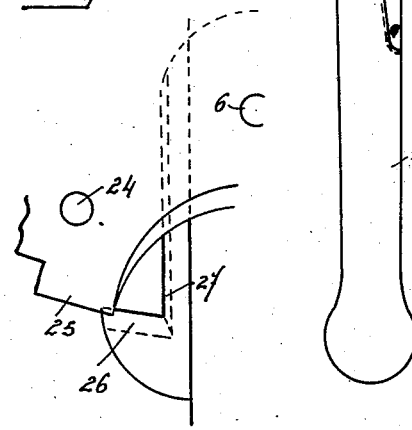
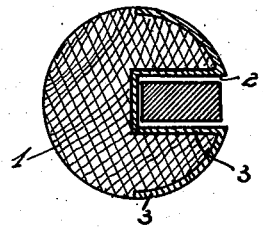
Inventor.
G. N. Vivenoy,
by Jno. L. Smire Atty.

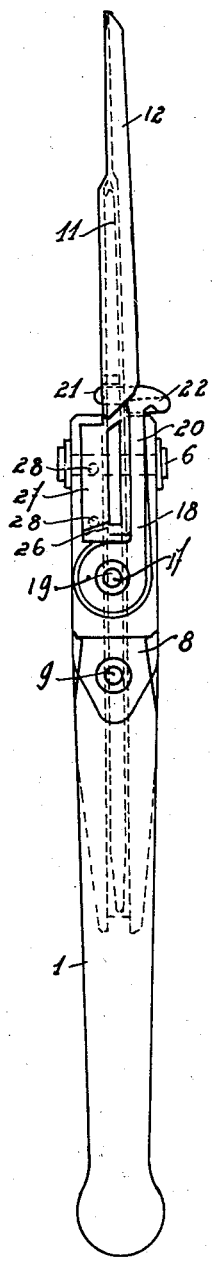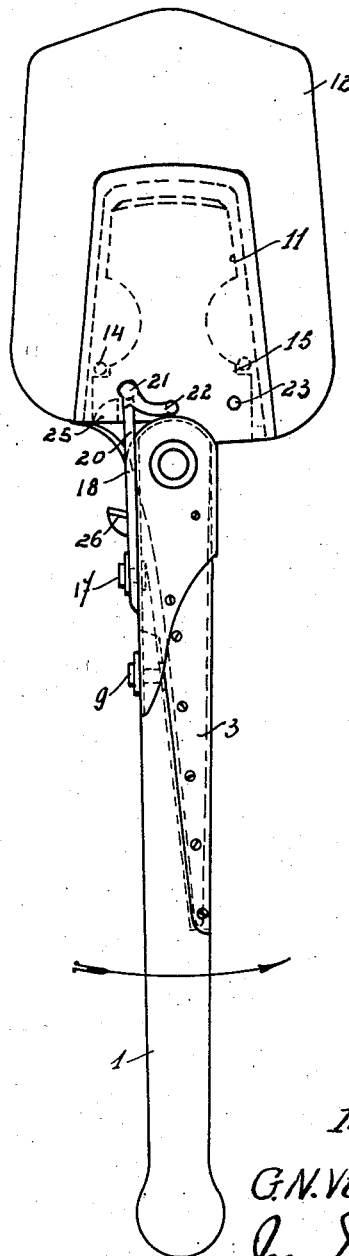

Patented May 6, 1930

1,757,029

UNITED STATES PATENT OFFICE

GUILLAUME NESTOR VIVENOY, OF BRUSSELS, BELGIUM

COMBINATION TOOL

Application filed February 10, 1928, Serial No. 253,408, and in Belgium August 6, 1927.

My invention relates to a combination tool comprising a shovel, a pick, an axe and shears.

The invention has for its object to provide a tool of this kind in which, when a certain tool is in use, the other tools which are permanently attached to the handle, are protected in such a manner to avoid being damaged by the use of the certain tool in question.

With this object in view my invention essentially consists in the special arrangements and combinations of parts hereinafter fully described and pointed out in the appended claims.

On the annexed drawings which show as an example, one embodiment of my invention.

Fig. 1 is a front elevation, the pick being in a position for use.

Fig. 2 is a detail view of the arrangement of the cutting edges forming the shears.

Fig. 3 gives a section on the line III—III in Fig. 1 and shows especially the position of the pick in the recess of the handle.

Fig. 4 is a side elevation, on the side carrying the catch, the shovel being in a position for use.

Fig. 5 is a front elevation of the tool, the shovel being in a position for use.

As shown on these figures, the tool comprises a handle 1, preferably of turned wood. This handle is hollowed out in its central part and towards the end, as shown in Fig. 3 so as to form a recess 2 for the pick. This recess is protected by a lining 3 in pressed metal, fixed to the handle by screws 4. At the end of the handle this lining 3 passes under a fitting 5 also made of one piece of pressed steel. This second fitting is fixed to the handle by a bearing or riveted pivot 6 and screws 7. The second fitting 5 is provided with a flat portion 8 which extends lengthwise the handle 1 and fits closely, so as to be fastened by a rivet 9 to the lining 3 which forms the sheath of the pick and so as to strengthen by this means the part subject to the working stress of the axe. On the bearing 6 there can turn a combination consisting of a pick 10 and an axe 11. Over this axe 11 the shovel 12 is slipped consisting of two pieces of sheet steel welded and riveted together and forming a sheath for the axe. In this sheath two rivets 14 are fixed which, when the shovel is in use (Fig. 5) bear against two shoulders 15 formed in the axe, so as to transmit the stress onto the centre of the bearing 6 in the axis of the handle 1 and at the same time to prevent the cutting edge 16 of the axe 11 to blunt itself at the bottom of the sheath 13.

A catch or bolt 18, preferably of steel, is mounted on the fitting 5 by a pivot pin 17 around which the catch is movable, this catch consisting of a wide circular flat part 19 and a flat extension 20 tangential to the circular part. This extension is provided at its end with a finger 21 which is perpendicular to it and which enters into the tools in order to retain them in their working position. The extension 20 of the catch 18 is provided with a finger-piece or hook 22 through which the catch may be manipulated by the operator to cause selective engagement of the finger 21 with either of the notches 23 or 24 and through such cooperation hold the tools in selected position, as will be clear from Figs. 1 and 5. This catch forms a spring by friction on the head of the handle fitting.

The axe 11 is provided with a lateral cutting portion 25 which in operation cooperates with edges 26 and 27, fixed by means of rivets 28 on the fitting 5 to form a shear of more or less conventional type. When in use, the axe rests against the catch 18, serving in a measure to relieve the strain on the central bearing 6.

The use of the tool is as follows:

The shovel 12, being in its place on the axe 11, is retained on the latter by the engagement in the notch 23 of the finger 21 of the flat extension 20 and is then in the position shown in Fig. 1, whereas the axe 11 is protected by the shovel, and the pick 10 is in its position for use. If it is desired to use the shovel, it suffices, by pulling on the catch 18, to disengage the finger 21 of the extension 20 from the notch 23 and to cause the the combination of shovel, axe and pick to pivot round the bearing 6, in order to bring the pick 10 into its recess 2 formed by the lining 3. The shovel, the axe and the pick are then retained in their new position by the engagement of the finger 21 of the extension 20, in the notch 24 (Fig. 5).

The shovel is then in position for use, while the pick 10 is withdrawn into the handle. When the shovel is in use, the strains to which it is subjected, are transmitted by the rivets 14 to the shoulders 15 of the axe and by these to the bearing 6, so that the use of the shovel cannot cause any blunting of the cutting edge of the axe. If on the other hand it is desired to use the tool as an axe, by manipulating the catch 18, the axe and the pick are brought back to the position shown in Fig. 1 and the shovel is taken off to use the axe.

If the shears are to be used, the shovel can remain fixed to the whole, and it suffices, the parts being in the position shown in Fig. 1, to introduce the wire to be cut between the cutting edge 25 formed by the axe and the cutting edges 26 and 27 formed by the spur fixed to the fitting 5 by the rivets 28, after which an appropriate pull is exercised on the handle 1.

The invention is evidently not limited to the constructional details of the handle. As already explained, this may be of turned wood, strengthened by the fittings 3 and 5, it may however be of metal and in one piece with these parts. If desired, the recess formed in the handle may be used to contain a screw-driver or other accessory tools, independently of the combination tool proper.

What I claim is:

1. A composite tool including a handle, a pick, an axe, said pick and axe being connected as a unit and pivotally supported with respect to the handle, said pick being housed in the handle when the axe is in inoperative relation to and in alignment with the handle, a shovel blade formed to present a sheath to receive the axe, whereby the shovel blade is removably supported on the axe, and means for fixing the unit tool in operative or inoperative relation to the handle, said means co-operating with the shovel blade when the latter is in position on the axe.

2. In a tool of the kind described, in combination a pick and an axe formed in one piece and rotatably mounted at the end of the handle, a removable shovel in which the axe is housed, the said shovel forming a sheath for the axe whereby the cutting edge of the axe is adapted to be protected when the shovel is used, a catch pivotally mounted at the end of the handle, a finger at the end of the said catch, the said finger being adapted to be introduced into notches cut in the body of the shovel on the right and the left of the longitudinal axis of the latter, whereby the axe and the shovel are connected together and the shovel is adapted to be removed from the axe and the piece formed by the axe and the pick is adapted to be fixed in a position at right angles to the handle or in a position parallel to the latter, the pick being introduced at this time into a recess formed in the handle.

In testimony whereof I have affixed my signature.

GUILLAUME NESTOR VIVENOY.